Feb. 22, 1949.    R. H. F. BOOT    2,462,463
ELECTRIC ARC CUTTING ELECTRODE
Filed May 1, 1945
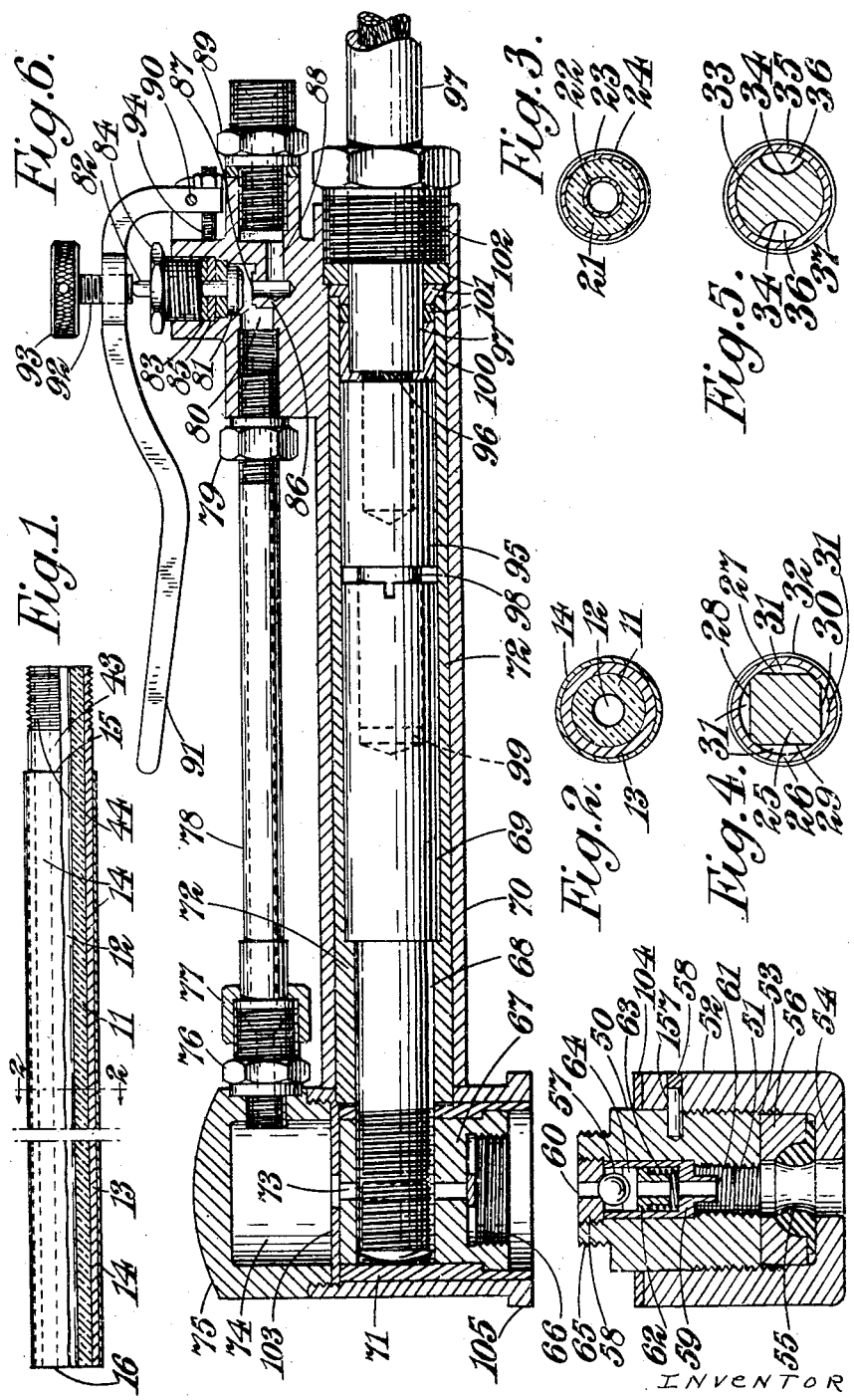
INVENTOR
R. H. F. Boot
By Watson, Cole, Grindle & Watson Patented Feb. 22, 1949

2,462,463

UNITED STATES PATENT OFFICE 2,462,463

ELECTRIC ARC CUTTING ELECTRODE

Robert Henry Farmer Boot, London, England, assignor to Under Water Welders & Repairers Limited, London, England, a British company Application May 1, 1945, Serial No. 591,287
In Great Britain March 3, 1944

Section 1, Public Law 690, August 8, 1946
Patent expires March 3, 1964

2 Claims. (Cl. 219—8)

This invention comprises improvements in or relating to electric arc cutting devices.

It is an object of this invention to provide a process and apparatus for cutting metals under water by the aid of an electric arc. It has previously been proposed to strike an electric arc between a hollow carbon or tubular metal electrode under water and to direct a stream of oxygen through the centre of the electrode into the arc with the object of aiding the cutting action of the arc and the present invention relates to a process of this type.

If a hollow carbon electrode is employed for the purpose it is found that, owing to the porosity of the carbon, part of the oxygen escapes through the walls of the electrode into the water instead of being directed as a jet on to the work. Furthermore, a requirement which is not satisfied by the refractory (that is to say heat resisting) carbon electrode is that the electrode should not be so brittle as to be liable to snap off under the effects of an accidental blow, such as may easily occur under water owing to the difficulties of vision as compared with working in air. On the other hand if a drawn metal tubular electrode is employed with the object of obviating leakage and brittleness, the electrode burns away at an undesirably high rate in the presence of the oxygen at the arc.

The present invention contemplates the employment of a composite electrode which partly consists of a relatively refractory and low conductivity main body of material and partly of a less refractory but stronger relatively high-conductivity material.

According to the present invention an electrode for under-water arc-cutting comprises a refractory main body of carbon and a conductor of relatively high-conductivity and non-brittle but less refractory metal extending along the main body, the electrode including a passage for oxygen from end to end. In the use of such a composite electrode the less refractory conductor may tend to burn back a short distance further than the more refractory carbon main body, but the main body burns away more slowly and the life of the electrode is longer than would be the case if the whole electrode were made of metal.

The metallic conductor is of tubular form around the carbon main body so that it acts to prevent oxygen leakage.

The carbon may be flatted or fluted and the high-conductivity conductor may consist of a tube spaced from the main body along the flatted or fluted portion so that the oxygen passes along the electrode between the tube and the main body. Preferably the high-conductivity conductor consists of brass or copper.

The invention further includes an appropriate holder for the electrodes and means to control the passage of oxygen therethrough.

The following is a description, by way of example, of one form of apparatus including a holder in accordance with the invention and of the process as carried out thereby:

In the accompanying drawings—

Figure 1 is a side elevation partly in longitudinal section through one form of electrode in accordance with the invention;

Figure 2 is a cross-section of the same to a larger scale;

Figure 3 is a cross-section of an alternative form;

Figures 4 and 5 are cross-sections of further alternative forms;

Figure 6 is a longitudinal section of a holder for use in connection with the electrodes shown in Figures 1 to 5.

Referring to Figures 1 and 2, the electrode consists of a hollow carbon main body 11 which may be, say, half an inch in diameter. Through this main body there is a central passage 12 which may be, say, $\frac{1}{16}$ of an inch in diameter. Over the external surface of the main body 11 there is a skin of copper 13. The skin may be constituted by a tightly fitting thin-walled copper tube but is preferably produced by electro-deposition in situ. Over the skin 13 there is a coating 14 of insulating material which is intended to prevent leakage of electric current into surrounding water. This coating may be constituted by a varnish of a suitable insulating material preferably polyvinyl chloride, applied in the form of its solution in, say, benzene or toluene, and allowed to dry. The coating 14 is stopped short of the end of the electrode as indicated at 15, Figure 1, so that the copper skin 13 is exposed at the end to enable a good electrical connection to be obtained in the holder. The arc is struck at the other end 16 of the electrode. The skin 13 is thickened at the end beyond the coating 14 where it is exposed, for example it may be covered with a metal bush 43 and this is screw-threaded as shown at 44 to fit in the holder hereinafter described. If the skin 13 consists of a tube which is slid over the carbon main body 11 it may be continued to the end of the electrode and screwthreaded without the provision of a bush.

Referring to Figure 3, this shows a carbon main body 21 having an internal copper tube 22 and an external copper sheath 23, covered with an insulating coating 24.

A further form of electrode according to the invention is shown in Figure 4 where the main body is constituted by a carbon member 25 over which is fitted a copper or brass tube 26. The main body 25 is flattened as at 27, 28, 29, 30 on four sides so as to leave spaces 31 between the outer tube 26 and the main body. These spaces constitute oxygen passages. The outer tube 26 is covered as before with an insulating coating 32, and is screwthreaded at the end to fit into the holder in a similar way to the screwthread 44 in Figure 1.

The main body 25 is of relatively low-conductivity electrically as compared with the brass or copper tube 26, and it is found that it acts similarly to the carbon main body described in connection with Figures 1 to 4 in that it burns away much more slowly than a drawn metal main body would do. The oxygen passages 31 which surround the main body are found to be very effective in promoting a good cutting action.

Figure 5 shows a further alternative comprising a carbon main body 33 which is fluted down the sides as indicated at 34 and is enclosed within a copper or brass tube 35. The flutes 34 provide oxygen spaces 36. The tube 35 is covered with an insulating sheath 37.

Figure 6 shows a holder which is adapted for use with the electrodes described in connection with Figures 1 to 5. The holder consists of a terminal block member 50 which is made of a heat-resisting dense metal such as a copper chromium alloy and which is internally screwthreaded at 51 to fit the screwthread 44 of the electrodes. The terminal block 50 is covered with a nose 52 of insulating material which is secured to it by a screwthread 53. The nose 52 has an internally projecting flange 54 which overlies a soft rubber packing member 55. The packing member 55 is supported by a metal ring 56 and the flange 54 grips the packing ring 55 and presses it against the ring 56. The insulating nose 52 is made of a hard material such as hard synthetic rubber and after it has been screwed in place it is fixed by means of a metal pin 57 the head of which is covered over with Chatterton's compound 58 or other insulating compound. The effect of screwing an electrode into the thread 51 is to secure a good electrical connection with the terminal block 50 and at the same time to secure that entry of water is prevented by the soft rubber sealing ring 55. Within the terminal block 50 is a ball valve 57 which rests on a seating member 58 screwed in the back of the terminal block. The seating member 58 also serves to seat in place a cage 59. Through the seating member 58 there is an oxygen passage 60 and through the cage 59 there is an oxygen passage 61 which forms a continuation of the passage 60. The ball 57 is held on to the seating member 58 by a slider 62 urged toward the ball by a spring 63. The slider has a central oxygen passage in continuation of the passage 61 and in order to prevent the ball valve 57 from sealing the passage in the slider the slider is provided with a transverse cut 64 like the screwdriver slot in the head of a screw, where it engages the ball valve 57. If oxygen under pressure is applied therefore to the passage 60 it can force down the ball 57 and enter the passage 61 and pass thence into the oxygen passages in the electrode, and so to the arc when the latter is struck at the other end of the electrode.

The terminal block 50 is externally screwthreaded at 65 to fit into a screwthread 66 in the interior of an intermediate block 67 in the end of the main body of the holder. The intermediate block 67 is secured on a screwed stem 68 of a cable adapter socket 69. The cable adapter socket 69 has its axis at right angles to the axis of the intermediate block 67 and the block and the adapter socket are both enclosed in the body 70 of the holder which is made of metal but is insulated from the adapter socket and the intermediate block by an insulating sleeve 71 around the intermediate block and a further sleeve 72 around the socket 69. Through the screwed end of the socket 69 and the intermediate block 67 there is an oxygen passage 73 which opens into an oxygen chamber 74 in a cap 75 screwed to the body of the holder 70. A nipple 76 screwed in the back of the cap 75 is connected by union nuts 77 to an oxygen supply pipe 78 and the supply pipe 78 is connected by a running joint and a lock-nut 79 to an oxygen valve chamber 80.

An oxygen control valve is provided consisting of a headed valve member 81 having a stem 82 which passes through packing washers 83 and a gland nut 84 arranged in a boss or enlargement 85 on the end of the body 70 of the holder. Below the valve member 81 is a seating 86 in the centre of which is a port 87 and depression of the stem 82 will close the valve member 81 on the seating and shut off the oxygen supply. The oxygen is supplied through a passage 88 and nipple 89 from a flexible supply pipe. Movement of the stem 82 of the valve 81 is effected by a lever 91 pivoted at 90 to the enlargement 85 and carrying an adjustment screw 92 with a knurled head 93. It is to be observed that the circular part of the holder body 70 constitutes a handle by which the holder can be grasped by the operator and the lever 91 extends in a general direction more or less parallel with the handle so that the lever 91 and the body 70 can be grasped together in the same hand. Consequently, pressure exerted through the grasping of the holder by the operator shuts off the oxygen but if the grasp is relaxed a little oxygen will be admitted freely to the electrode. If it is desired to shut off oxygen altogether after an electrode has been used this can be done by screwing up the knurled-head screw 92. The reaction of the screw 92 is taken by a screw 94 acting as an adjustable stop.

The electrical connections for supplying current to the electrode through the cable socket member 69 comprise a thimble 95 which is soldered to the end 96 of the supply cable 97. The thimble is provided with a slightly tapered plug 98 which enters and fits firmly in a correspondingly tapered hole 99 in the cable socket 69. The cable 97 is rubber insulated and water is excluded from the thimble 95 by sealing the joint with Chatterton's compound 100, backed by three rubber gland rings 101 and a gland nut 102.

There is an insulating washer 103 between the cap 75 and the intermediate block 67 and a soft rubber washer 104 makes a watertight joint between the cover 52 of the terminal block 50 and the flange 105 of the body 70.

It will be seen that this holder affords a good electrical connection between the cable 97 and the electrode which is screwed into the terminal block 50 and also an effective and easily controlled gas supply to such electrode which supply is not liable to leak away into the atmosphere. Furthermore the insulation is continued by the sheath 14 on the electrode, which enters the rubber ring 55, right down to the arc and thus electrolysis is wholly prevented.

It is more convenient that the regulating valve 81 should be normally open, and adapted to be closed by pressure of the lever 91 than that it should be normally shut and adapted to be opened by such pressure because if the valve is normally open the operator does not have to maintain a strong grasp of the parts when the arc is working, which is during the greater part of the time that he is engaged on the job.

In use, an open-circuit voltage of about 80 volts is adopted which falls to about 25 to 35 volts when an arc has been struck by the operator between the end of the electrode and a metallic plate or other part which is to be cut. As soon as the operator has struck the arc he reduces the pressure of his grasp on the handle and thereby opens the oxygen valve and causes a stream of oxygen to be directed upon the work. Cutting then proceeds. The amount of the current for cutting plates up to two inches thick may be about 350 amperes. Cutting will proceed effectively under the surface of water or any other liquid. The oxygen pressure must, of course, be adequate to overcome pressure of water surrounding the arc. It is found that when cutting under water a cut in heavy steel plate may be made at the rate of one inch of cut for every inch of electrode which is burnt away.

I claim:

1. An electrode for underwater arc cutting comprising a refractory main body of carbon, a metal casing surrounding the carbon and an insulating covering over the metal casing, the carbon and casing being formed to provide a passage for oxygen from end to end of the electrode within the casing.

2. An electrode for underwater arc cutting comprising a refractory main body of carbon, a metal casing surrounding the carbon, an insulating covering over the metal casing throughout the length thereof from one end to a point near the other end, said metal casing between the end of the insulating covering and the end of the electrode comprising a smooth circular portion adapted to afford a watertight joint with a cooperating joint member of a holder and a screw-threaded portion at the end of the electrode beyond the smooth circular portion, the carbon and casing being formed to provide a passage for oxygen from end to end of the electrode within the casing.

ROBERT HENRY FARMER BOOT.

REFERENCES CITED

The following references are of record in the file of this patent:

UNITED STATES PATENTS

| Number | Name | Date |
| --- | --- | --- |
| 1,314,603 | Mott | Sept. 2, 1919 |
| 1,609,859 | Bond | Dec. 7, 1926 |
| 1,687,081 | Chapman | Oct. 9, 1928 |
| 2,210,640 | Swafford | Aug. 6, 1940 |
| 2,371,945 | Barbeck | Mar. 20, 1945 |
| 2,398,427 | Hediger | Apr. 16, 1946 |